(12) United States Patent
Farshidi et al.

(10) Patent No.: US 10,354,040 B1
(45) Date of Patent: Jul. 16, 2019

(54) SYSTEMS AND METHODS FOR CLOCK TREE GENERATION WITH BUFFERS AND INVERTERS

(71) Applicant: Cadence Design Systems, Inc., San Jose, CA (US)

(72) Inventors: Amin Farshidi, Austin, TX (US); Thomas Andrew Newton, Great Cambourne (GB); Zhuo Li, Austin, TX (US); Charles Jay Alpert, Cedar Park, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 75 days.

(21) Appl. No.: 15/676,767

(22) Filed: Aug. 14, 2017

(51) Int. Cl.
*G06F 17/50* (2006.01)
*G06F 1/324* (2019.01)
*G06F 1/3296* (2019.01)

(52) U.S. Cl.
CPC .......... *G06F 17/5072* (2013.01); *G06F 1/324* (2013.01); *G06F 1/3296* (2013.01)

(58) Field of Classification Search
USPC ......... 716/111, 113, 139, 102, 106, 108, 110
See application file for complete search history.

(56) References Cited

U.S. PATENT DOCUMENTS

| | | | |
|---|---|---|---|
| 6,698,006 B1 * | 2/2004 | Srinivasan | G06F 1/10 716/114 |
| 8,629,548 B1 * | 1/2014 | Andreev | G06F 1/10 257/691 |
| 2005/0242866 A1 * | 11/2005 | Vadi | G06F 1/10 327/291 |
| 2008/0066043 A1 * | 3/2008 | Lin | G06F 17/505 326/93 |
| 2010/0225353 A1 * | 9/2010 | Chang | G06F 1/10 326/93 |
| 2015/0227660 A1 * | 8/2015 | Agarwal | G06F 17/5022 716/139 |

\* cited by examiner

*Primary Examiner* — Brian Ngo
(74) *Attorney, Agent, or Firm* — Schwegman Lundberg & Woessner, P.A.

(57) ABSTRACT

Various embodiments provide for generation of a clock tree for a circuit design using a mix of a set of buffers and a set of inverters. Some embodiments balance use of buffers and inverters such that the generated clock tree leverages buffers to lower driver count and clock tree, and leverages inverters for lower power usage and duty cycles.

10 Claims, 10 Drawing Sheets

SYSTEMS AND METHODS FOR CLOCK TREE GENERATION WITH BUFFERS AND INVERTERS

TECHNICAL FIELD

Embodiments described herein relate to circuit design and, more particularly, to systems, methods, devices, and instructions for generating a clock tree for a circuit design, such as an integrated circuit (IC).

BACKGROUND

Electronic design automation (EDA) software systems commonly perform generation of a clock tree that uses a branching network of fan-out buffers or fan-out inverters to distribute a clock signal from a root clock signal source to a set of clock sinks within a circuit design. The clock sinks can comprise devices in the circuit design to be clocked by a clock signal. A clock tree can vary in the number of buffers or inverters to fan-out and deliver a clock signal to clock sinks, and generally depends on the number of clock sinks that need to receive the clock signal.

After initially establishing positions of fan-out buffers or fan-out inverters and routing signal paths between them and clock sinks, a conventional clock tree synthesis (CTS) tool of an EDA software system can estimate the path delays from clock tree root to all clock sinks and then insert additional buffers or inverters into various branches of clock tree as needed to reduce variations in path delays to the clock sinks, thereby balancing the clock tree.

BRIEF DESCRIPTION OF THE DRAWINGS

Various ones of the appended drawings merely illustrate example embodiments of the present disclosure and should not be considered as limiting its scope.

DETAILED DESCRIPTION

Clock tree design is a major step in circuit (e.g., integrated circuit) physical design, as it can significantly affect the performance and power consumption of the circuit design. To address complexity in clock tree synthesis (CTS), traditionally only inverters or only buffers are used for clock tree generation. However, both these choices are on the extreme side. The conventional clock tree generation using only inverters or only buffers is usually based on a user's preference. Traditionally, the assumption has been that using only inverters improve power consumption and duty cycles of the clock tree, while using only buffers permits the clock tree to have lower driver count and lower number of clock tree levels. However, these assumptions are not accurate in every situation. For instance, with respect to different libraries and different slew levels, using buffers to generate portions of a clock tree can result in better (e.g., lower) power usage by the clock tree than using inverters. Additionally, in some instances, lowering driver count and clock tree levels by using buffers may do so at the expense of generating a clock tree solution that uses more power than using inverters. As such, buffer-only clock trees and inverter-only clock trees represent extreme solutions for clock tree generation that fail to leverage benefits of different driver types.

Various embodiments described herein generate a clock tree of a circuit design using a mix of inverters and buffer to exploit the benefits of both approaches (buffers and inverters) in a balanced manner. Clock tree generation, using a mix of buffers and inverters as described herein, can lead to a clock tree with improved quality of result (QoR) over conventionally generated clock trees. Clock tree generation according to an embodiment may achieve lower power consumption, decreased driver count, reduced clock tree levels, or some combination thereof, over conventionally generated clock trees. Additionally, the reduction in driver count and reduction in clock tree levels can result in less circuit area being used by the generated clock tree.

An embodiment may utilize one of several approaches to generating a clock tree of a circuit design. According to one approach, any new driver created during clock tree generation (e.g., build up) may be selected from one of a buffer or an inverter based on performance (e.g., slew, latency, power consumption, etc.) of a resulting clock tree. This approach takes a power-aware, mixed buffers and inverters, approach to generating a clock tree.

According to another example approach, a buffer-only clock tree may be generated and then, in a post-processing operation, one or more portions of the buffer-only clock tree may be transformed to swap buffers with inverters to improve performance (e.g., power consumption) of a transformed clock tree. According to yet another approach, an inverter-only clock tree may be generated and then, in a post-processing operation, one or more portions of the inverter-only clock tree may be transformed to swap inverters with buffers to improve performance (e.g., power consumption) of a transformed clock tree. These last two approaches can utilize a post-processing operation to swap driver types in order to improve power consumption by the generated clock tree.

As used herein, a driver of a clock tree can include, without limitation, a buffer or an inverter. Though various embodiments disclosed herein may be described with respect to buffers and inverters, other embodiments may consider different or additional driver types during generation of a clock tree.

Reference will now be made in detail to embodiments of the present disclosure, examples of which are illustrated in the appended drawings. The present disclosure may, however, be embodied in many different forms and should not be construed as being limited to the embodiments set forth herein.

Figure 1:
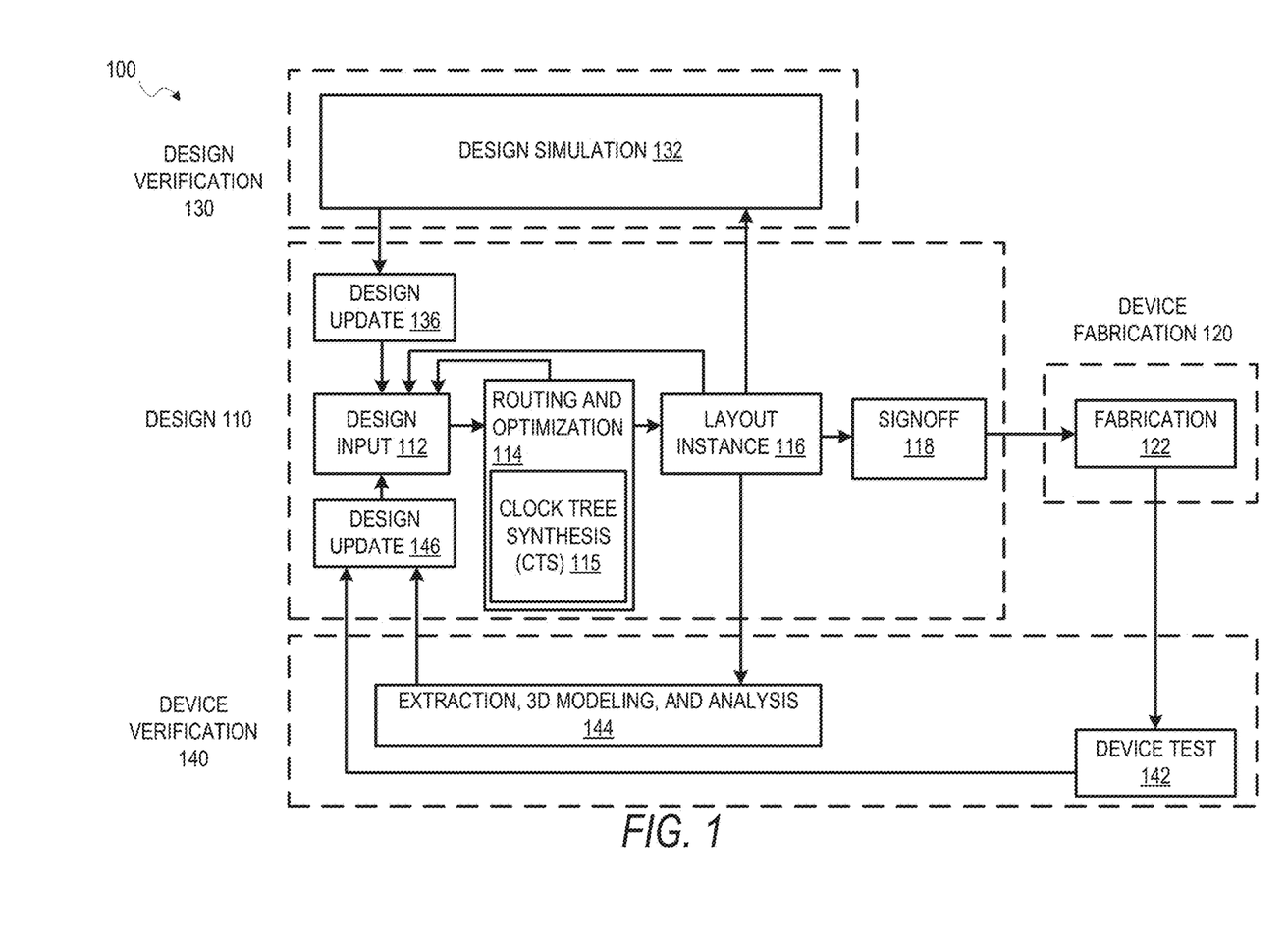
FIG. 1 is a diagram illustrating an example design process flow for generating a clock tree with buffers and inverters, according to some embodiments.

FIG. 1 is a diagram illustrating an example design process flow 100 for generating a clock tree with buffers and inverters, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. While the design process flow 100 shows optimization 114 occurring prior to a layout instance 116, routing, timing analysis, and optimization 114 may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

As shown, the routing and optimization 114 operation includes a clock tree synthesis (CTS) 115 operation, which may be performed in accordance with various embodiments described herein. In particular, the CTS 115 operation can generate a clock tree that delivers a clock signal from a clock tree root, which comprises a clock source of a circuit design, to a plurality of clock tree leaf nodes, which comprises a plurality of clock tree sinks within the circuit design. According to various embodiments, the CTS 115 operation can use different drivers (e.g., buffers or inverters) at various branches of the generated clock tree, and can balance mixed usage of different drivers, based on satisfaction of a set of clock tree design constraints, which can include slew, latency, and power consumption by the generated clock tree. As a result, various embodiments can determine the position of different drivers, within a hierarchy of the generated clock tree, for fanning out a clock signal from a clock source to clock sinks, such as flip-flops and other clocked devices with the circuit design.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

As described in more detail below, a design update 136 from the design simulation 132; a design update 146 from the device test 142 or the extraction, 3D modeling, and analysis 144 operations; or the design input 112 operation may occur after the initial layout instance 116 is generated.

In various embodiments, whenever design inputs are used to update or change an aspect of a circuit design, a timing analysis and the routing and optimization 114 operation may be performed.

FIGS. 2-5 are flowcharts illustrating example methods for generating a clock tree with buffers and inverters, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Figure 2:
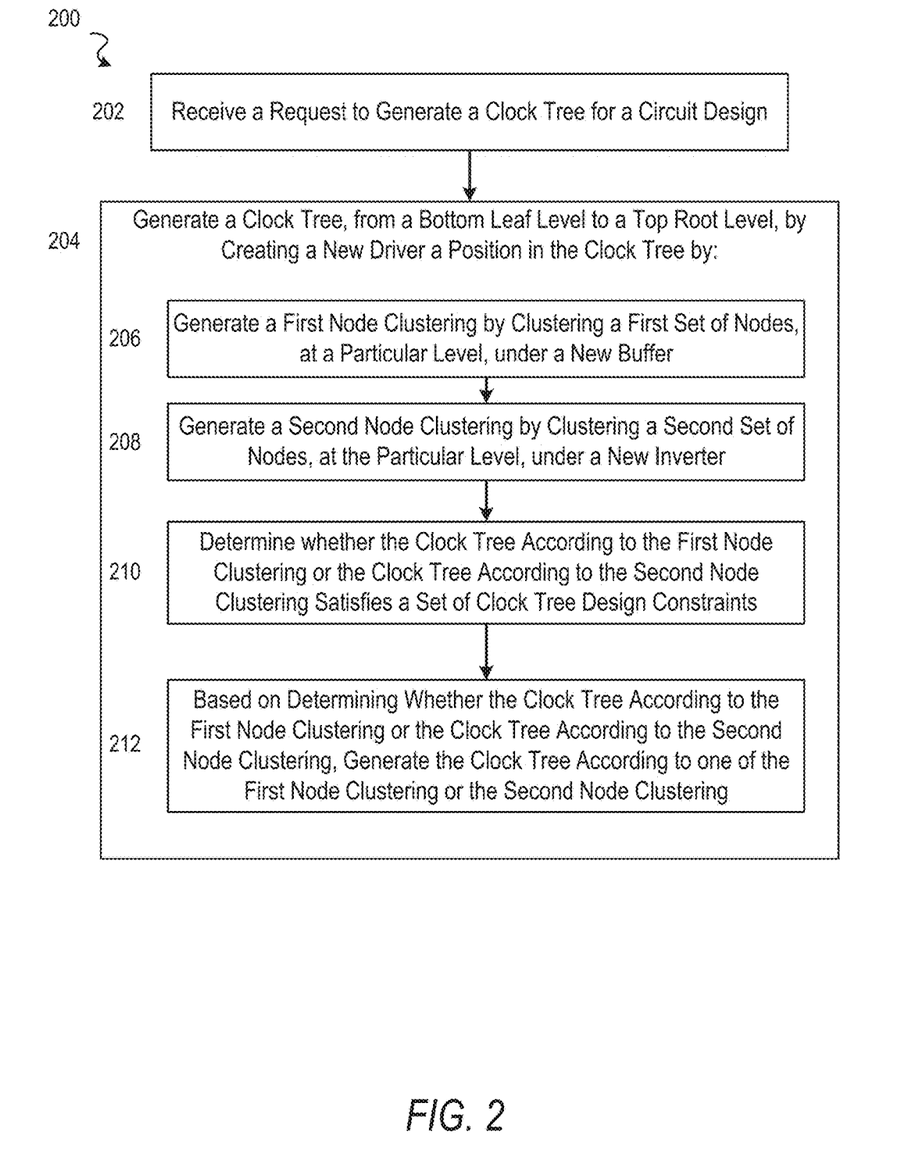
FIGS. 2-5 are flowcharts illustrating example methods for generating a clock tree with buffers and inverters, according to some embodiments.

Referring now to FIG. 2, the flowchart illustrates the example method 200 for generating a clock tree for a circuit design, according to some embodiments. For some embodiments, the method 200 is performed as part of a routing processing applied to a circuit design (e.g., by an EDA software system). Additionally, the method 200 may be performed after a determination that an option for buffer-only clock tree generation or an option for inverter-only clock tree generation (e.g., in the EDA software system) is not enabled. An operation of the method 200 (or another method described herein) may be performed by a hardware processor (e.g., central processing unit or graphics processing unit) of a computing device (e.g., desktop, server, etc.). According to some embodiments, the method 200 involves selecting between driver types when creating new drivers during clock tree generation.

The method 200 as illustrated begins with operation 202 receiving a request to generate a clock tree for a circuit design. According to various embodiments, the clock tree to be generated will include a bottom leaf level, comprising a plurality of clock sinks of the circuit design, and include a top root level comprising a clock signal source of the circuit design. As noted herein, a clock sink can include a clocked device of the circuit design that is to receive a clock signal from the clock signal via the clock tree.

The method 200 continues with operation 204 responding to the request of operation 202 by generating the clock tree, from the bottom leaf level of the clock tree to the top root level of the clock tree (e.g., from the bottom up) by creating a new driver at a position in the clock tree by operations 206-212, as described below. For some embodiments, operations 206-212 is performed for each new driver created during generation of the clock tree by operation 204. As noted herein, the new driver may include, without limitation, a buffer or an inverter. The clock source is at the top root level and the clock sinks are at the bottom leaf level, or both may be identified prior to, or as part of, operation 204.

Within operation 204, the method 200 continues with operation 206 generating a first node clustering by clustering a first set of nodes of the clock tree, at a particular level of the clock tree, under a new buffer created at the position in the clock tree where the new driver is being created. The position of the new buffer may be a tree level, in the clock tree hierarchy, that is above and adjacent to the particular level. The first node clustering may be generated in a first temporary, intermediate clock tree that will be subsequently evaluated, by operation 210, against a set of clock tree design constraints.

Within operation 204, the method 200 continues with operation 208 generating a second node clustering by clustering a second set of nodes of the clock tree, at the particular level of the clock tree, under a new buffer created at the position in the clock tree where the new driver is being created. The particular level of the second set of nodes and the position of the new inverter may be the same as those of operation 204. Accordingly, the position of the new buffer may be a tree level, in the clock tree hierarchy, that is above and adjacent to the particular level. The second node clustering may be generated in a second temporary, intermediate clock tree that will be subsequently evaluated, by operation 210, against the set of clock tree design constraints.

Within operation 204, the method 200 continues with operation 210 determining whether the clock tree according to the first node clustering or the clock tree according to the second node clustering satisfies a set of clock tree design constraints. The set of clock tree design constraints can include, without limitation, slew within the clock tree and a set of latencies within the clock tree.

Within operation 204, the method 200 continues with operation 212 generating the clock tree according to one of the first node clustering or the second node clustering based on the determination by operation 210. In particular, in response to operation 210 determining that only the clock tree according to the first node clustering satisfies the set of clock tree design constraints, operation 212 may generate the clock tree according to the first node clustering. Alternatively, in response to operation 210 determining that only the clock tree according to the second node clustering satisfies the set of clock tree design constraints, operation 212 may generate the clock tree according to the second node clustering.

Additionally, operation 210 may determine that both the clock tree according to the first node clustering and the clock tree according to the second node clustering satisfy the set of clock tree design constraints. In such instances, operation 212 may determine which one of the first node clustering or the second node clustering will cause lower power usage by the clock tree. In response to operation 212 determining that the first node clustering will provide lower power usage by the clock tree, operation 212 may generate the clock tree according to the first node clustering. Otherwise, in response to operation 212 determining that the second node clustering will provide lower power usage by the clock tree, operation 212 may generate the clock tree according to the second node clustering. The generated clock tree may be stored to memory, and one or more subsequent operations may build upon the clock tree as generated by operation 212. Accordingly, the generated clock tree by operation 212 may only represent a portion of the overall clock tree to be generated.

Figure 3:
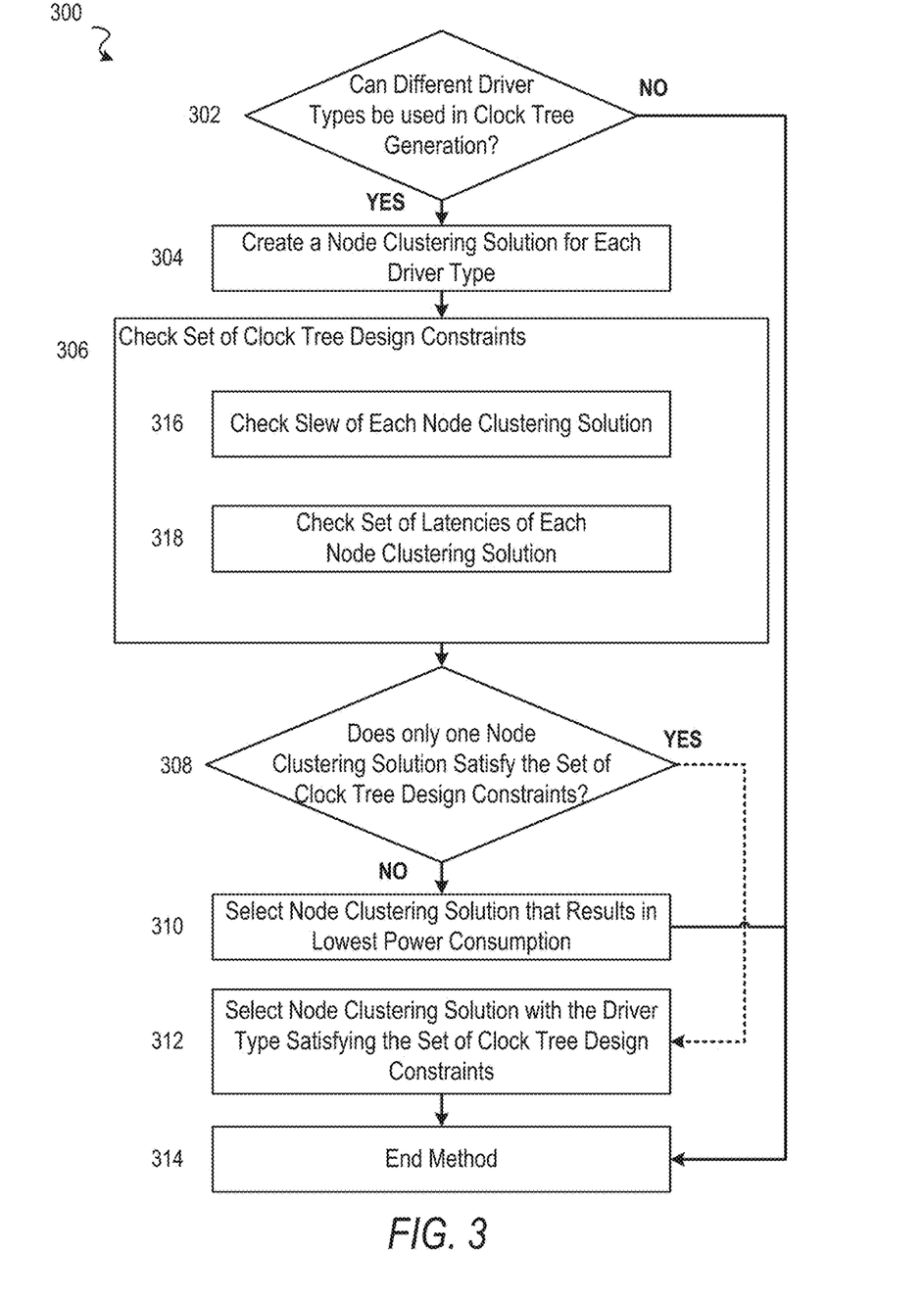

Referring now to FIG. 3, the flowchart illustrates the example method 300 for generating a clock tree for a circuit design, according to some embodiments. Like the method 200 of FIG. 2, the method 300 of FIG. 3 may be performed as part of a routing processing applied to a circuit design. Additionally, the method 300 may be performed after a determination that an option for buffer-only clock tree generation or an option for inverter-only clock tree generation (e.g., in the EDA software system) is not enabled. An operation of the method 300 may be performed by a hardware processor. According to some embodiments, the method 300 involves selecting between driver types when creating new drivers during clock tree generation.

The method 300 as illustrated begins with operation 302 determining whether different driver types (e.g., inverters or buffers) can be used in clock tree generation. For instance, operation 302 may review a set of settings, within an EDA software system that is performing method 300, to determine whether or not an option for buffer-only clock tree generation or an option for inverter-only clock tree generation is enabled. As shown, if operation 302 determines that different driver types can be used in the clock generation, the method 300 proceeds to operation 304. If operation 302 determines otherwise, the method 300 proceeds to the end of the method 300, which is represented by operation 314.

For some embodiments, operations 304-312 are performed when creating a new driver in the clock tree while building the clock tree from the bottom up, from the clock sinks at the bottom leaf level to the clock source at the top root level. Accordingly, when a new driver is to be created at a position within the clock tree, at operation 304, a node clustering solution is created at the position for each driver type available. For example, where the driver types include an inverter or a buffer, operation 304 may create one node clustering solution at the position using inverters and another node clustering solution at the position using buffers.

From operation 304, the method 300 continues to operation 306, where each node clustering solution created at operation 304 is checked against a set of clock tree design constraints. As shown, this includes operation 306 checking each node clustering solution for slew (operation 316) and checking each node clustering solution for a set of latencies (operation 318).

From operation 306, the method 300 continues with operation 308 determining whether one node clustering solution satisfies the set of clock tree design constraints. If no, the method 300 proceeds to operation 310, where the node clustering solution that results in the lowest power consumption is selected for the clock tree. If yes, the method 300 continues with operation 312 selecting the only node clustering solution to satisfy the set of clock tree constraints. After operation 310 or operation 312, the method 300 continues to operation 314, which represents the end of the method 300.

Figure 4:
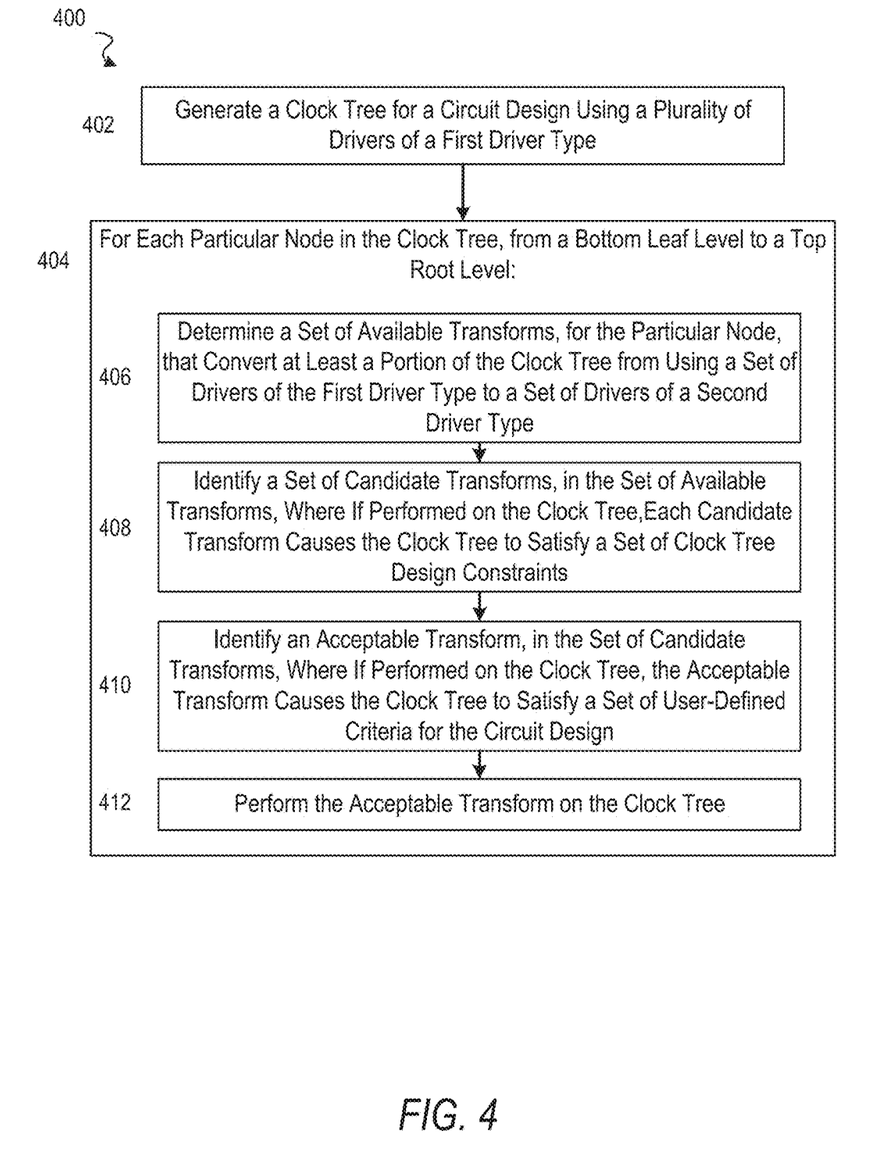

Referring now to FIG. 4, the flowchart illustrates the example method 400 for generating a clock tree for a circuit design, according to some embodiments. Like the method 200 of FIG. 2, the method 400 may be performed as part of a routing processing applied to a circuit design. An operation of the method 400 may be performed by a hardware processor. According to some embodiments, the method 400 involves transforming, or otherwise reconfiguring, at least a portion of a clock tree that was generated using only one type of driver (e.g., only buffers or only inverters).

The method 400 as illustrated begins with operation 402 generating a clock tree for a circuit design using a plurality of drivers of a first driver type. For instance, operation 402 may produce an inverter-only clock tree, or a buffer-only clock tree. Additionally, operation 402 may generate the clock tree from the bottom up.

The method 400 continues with operation 404 transforming the clock tree generated by operation 402 and doing so from the bottom leaf level to the top root level of the clock tree. In particular, operation 404 includes operations 406-412, which are performed for each particular node in the clock tree, starting from the bottom leaf level of the clock tree to the top root level of the clock tree.

Within operation 404, operation 406 determine a set of available transforms, for the current particular node, that convert at least a portion of the clock tree from using a set of drivers of the first driver type to a set of drivers of a second driver type. For some embodiments, the first driver type comprises a type of buffer and the second driver type comprises a type of inverter. Alternatively, for some embodiments, the first driver type comprises a type of inverter and the second driver type comprises a type of buffer.

Transformations included by the set of available transforms may vary between embodiments. For instance, the set of available transforms may include a transform that involves: converting a set of buffers to a set of inverters by converting each buffer in the set of buffers to an inverter, where each buffer in the set of buffers is a child of the current particular node; and inserting a new inverter between the current particular node and the set of inverters. With respect to the current particular node being processed by operation 404, this transform may further involve a preliminary operation of identifying a set of buffers where each buffer in the set of buffers is a child of the current particular node. An example of such a transform is illustrated by transformation 700 of FIG. 7, which is later described herein in greater detail.

In another instance, the set of available transforms may include a transform that involves: converting a set of buffers to a set of inverters by converting each buffer in the set of buffers to an inverter, where the set of buffers comprises a parent buffer and a set of child buffers that are children of the parent buffer, and where the parent buffer is a child of the current particular node. With respect to the current particular node being processed by operation 404, this transform may further involve a preliminary operation of identifying a set of buffers comprising a parent buffer and a set of child buffers that are children of the parent buffer, and where the parent buffer is a child of the current particular node. An example of such a transform is illustrated by transformation 702 of FIG. 7, which is later described herein in greater detail.

In another instance, the set of available transforms may include a transform that involves: converting a set of inverters to a set of buffers by converting each inverter in the set of inverters to a buffer, where each inverter in the set of inverters is a child of a parent inverter, and where the parent inverter is a child of the current particular node; removing the parent inverter; and coupling the current particular node to the set of buffers. With respect to the current particular node being processed by operation 404, this transform may further involve a preliminary operation of identifying a set of inverters where each inverter in the set of inverters is a child of a parent inverter, and where the parent inverter is a child of the current particular node. Examples of such a transform are illustrated by transformation 600 of FIG. 6 and by transformation 800 of FIG. 8, which are later described herein in greater detail.

In another instance, the set of available transforms may include a transform that involves: converting a set of inverters to a set of buffers by converting each inverter in the set of inverters to a buffer, where the set of inverters comprises a parent inverter and a set of child inverters that are children of the parent inverter, and where the parent inverter is a child of the current particular node. With respect to the current particular node being processed by operation 404, this transform may further involve a preliminary operation of identifying a set of inverters where the set of inverters comprises a parent inverter and a set of child inverters that are children of the parent inverter, and where the parent inverter is a child of the current particular node. Examples of such a transform are illustrated by transformation 802 of FIG. 8, which are later described herein in greater detail.

After operation 406, operation 408 identifies a set of candidate transforms in the set of available transforms where, if performed on the clock tree, each candidate transform causes the clock tree to satisfy a set of clock tree design constraints. As noted herein, the set of clock tree design constraints can include, without limitation, slew within the clock tree and a set of latencies within the clock tree.

After operation 408, operation 410 identifies an acceptable transform, in the set of candidate transforms where, if performed on the clock tree, the acceptable transform causes the clock tree to satisfy a set of user-defined criteria for the circuit design. For some embodiments, the set of user-defined criteria include a criterion that performing (e.g., applying) the acceptable transform on the clock tree causes the clock tree to use lower power than performing any other candidate transform in the set of candidate transforms on the clock tree. The set of user-defined criteria may include other such criteria.

After operation 410, operation 412 performs (e.g., applies) the acceptable transform on the clock tree. After operations 406-412 are repeated for each particular node in the clock tree generated by operation 402, the clock tree resulting from operation 404 may comprise at have at least a portion that (when compared to the clock tree of operation 402) was transformed using a driver of a first driver type to using a driver of a second driver type.

Figure 5:
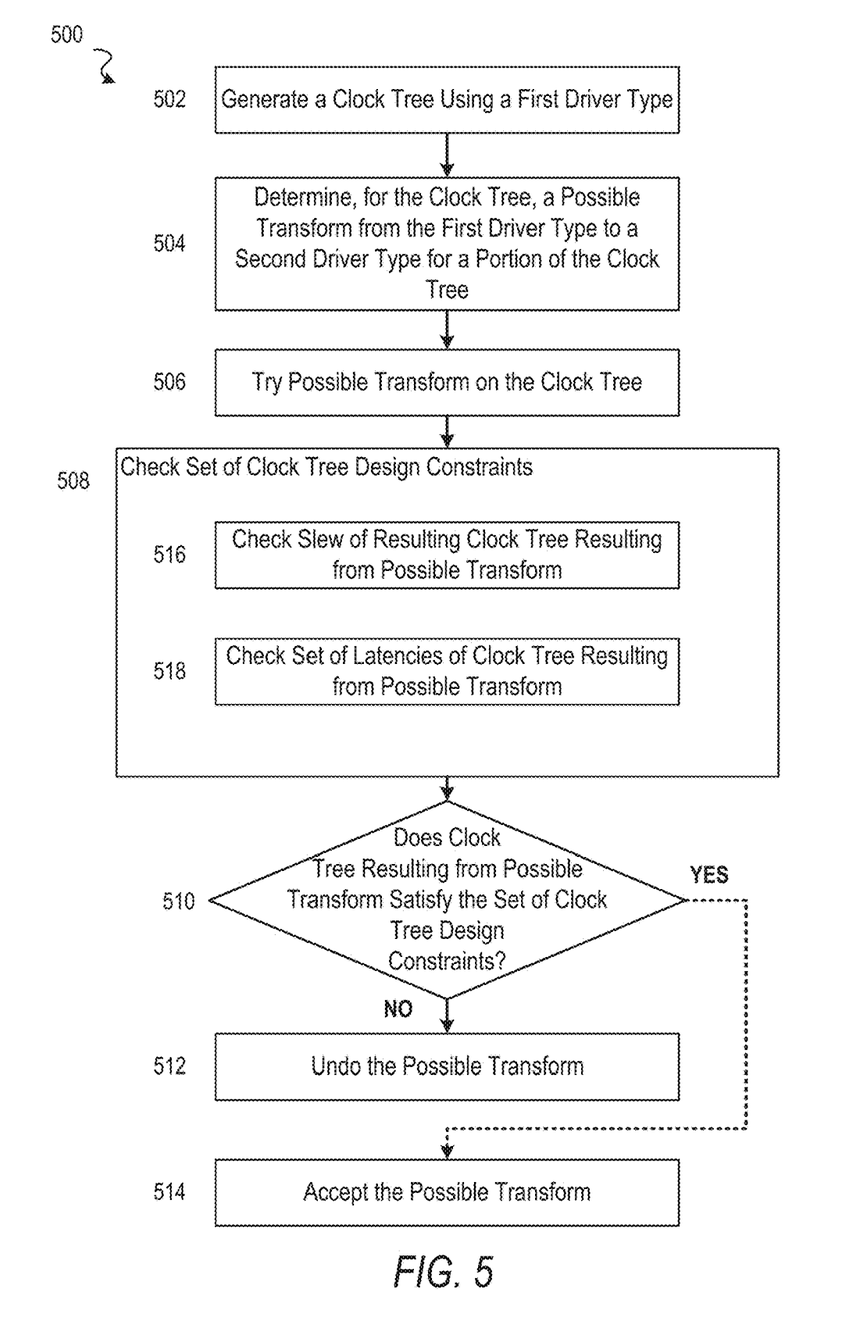

Referring now to FIG. 5, the flowchart illustrates the example method 500 for generating a clock tree for a circuit design, according to some embodiments. Like the method 200 of FIG. 2, the method 500 may be performed as part of a routing processing applied to a circuit design. An operation of the method 500 may be performed by a hardware processor. According to some embodiments, the method 500 involves transforming, or otherwise reconfiguring, at least a portion of a clock tree that was generated using only one type of driver (e.g., only buffers or only inverters).

The method 500 as illustrated begins with operation 502 generating a clock tree using a first driver type (e.g., inverter or buffer). As noted herein, operation 502 may produce an inverter-only clock tree, or a buffer-only clock tree. Additionally, operation 502 may generate the clock tree from the bottom up.

The method 500 continues with operations 504-514 which, according to some embodiments, are performed for each portion (e.g., particular node) of the clock tree (generated by operation 502) from the bottom up, starting from the bottom leaf level of the clock tree to the top root level of the clock tree.

For the current particular node, operation 504 determines a possible transform from the first driver type to a second driver types for a current portion of the clock tree. From operation 502, the method 500 continues with operation 506 trying the possible transform determined at operation 502. From operation 506, the method 500 continues with operation 508 checking the clock tree, resulting from operation 506, against a set of clock tree design constraints. As shown, this includes operation 508 checking slew (operation 516) and checking a set of latencies (operation 518) of the clock tree resulting from operation 506.

From operation 508, the method 500 continues with operation 510 determining whether the clock tree resulting from operation 506 satisfies the set of clock tree design constraints. If yes, the method 500 continues to operation 514 where the current possible transform is accepted and the clock tree resulting from operation 506 stays as-is. If no, the method 500 continues with operation 512 undoing the current possible transform, thereby restoring the clock tree to a version prior to operation 506.

Though not shown, for some embodiments, operation 504 may determine a plurality of possible transforms from the first driver type to the second driver type for the current portion of the clock tree. In some such embodiments, each possible transform, in the plurality of possible transforms, may be tried on the clock tree by operations 504-510 (e.g., in parallel or in sequence). Of those possible transforms tried on the clock tree, the transform that satisfies the set of clock tree design constraints and meets a set of user-defined criteria may be selected as the accepted transform. For instance, the set of user-defined criteria may include selecting as the accepted transform the possible transform that results in the most reduction of the clock tree's power consumption when compared against the pre-transform clock tree.

Figure 6:
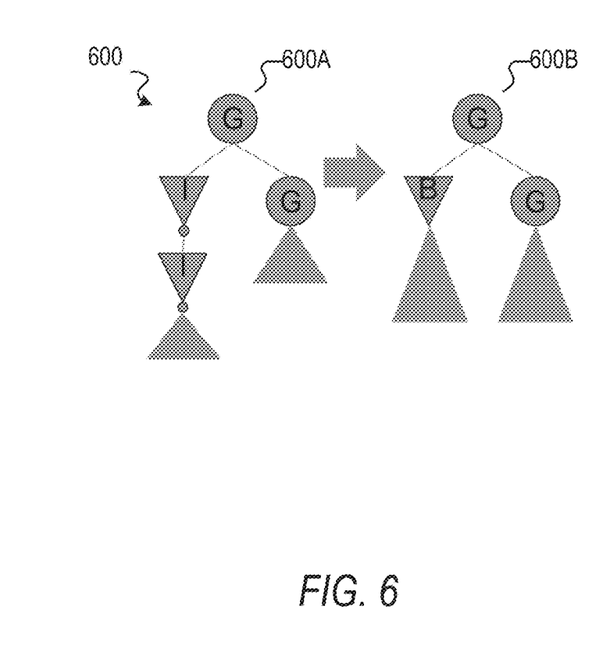
FIGS. 6-8 are diagrams illustrating example transformations that may be applied when generating a clock tree, according to some embodiments.
Figure 7:
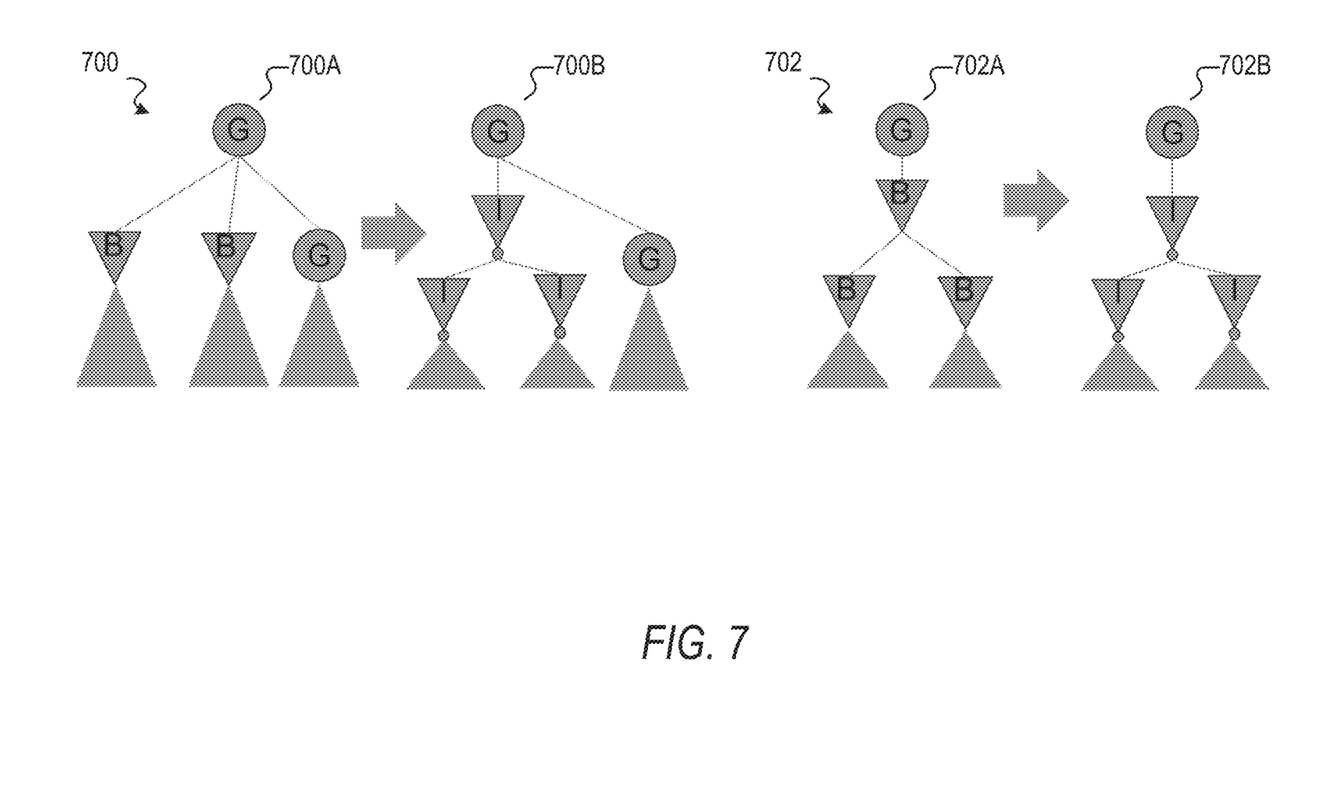
Figure 8:
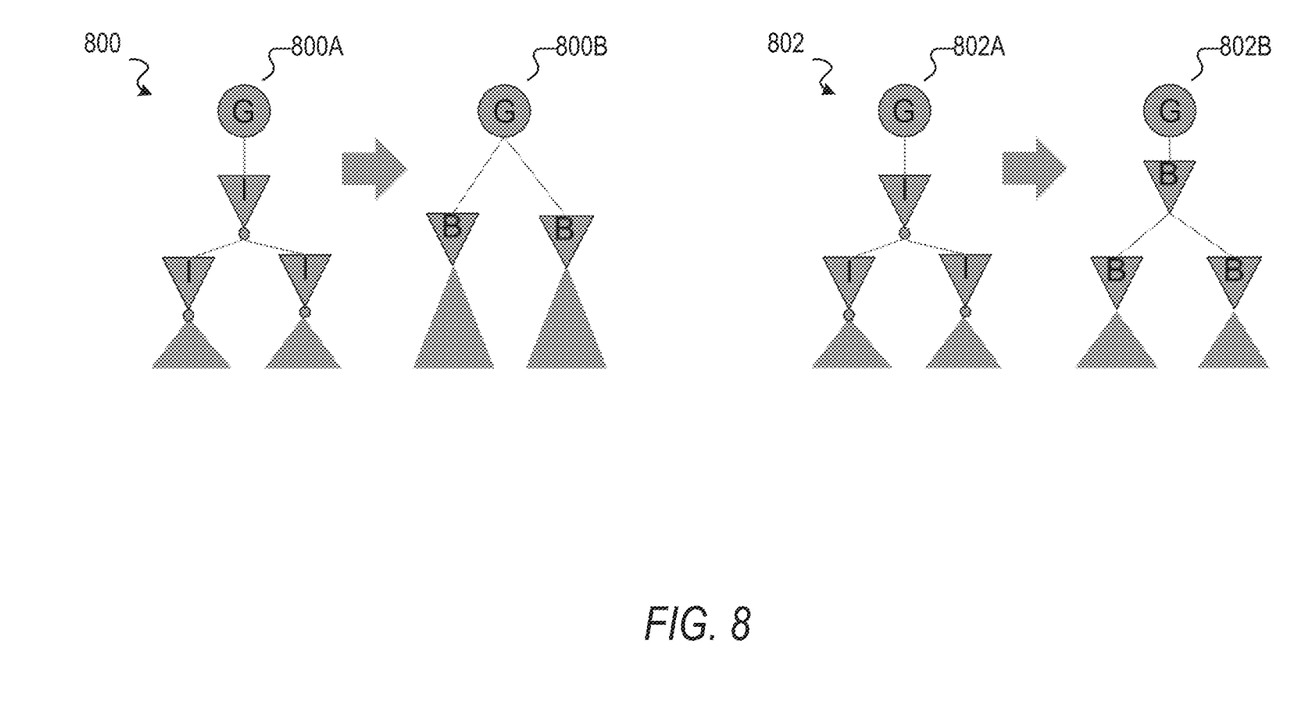

FIGS. 6-8 illustrate diagrams illustrating example transformations that may be applied when generating a clock tree, according to some embodiments. As noted herein, one or more of the example transformations illustrated by FIGS. 6-8 may be applied by the method 400 of FIG. 4 or the method 500 of FIG. 5.

FIG. 6 illustrates an example transformation 600, where the transformation 600 transforms a portion 600A of a clock tree, which use inverters, to a portion 600B that use buffers. In particular, the transformation 600 may convert each child inverter of the portion 600A to a buffer and then remove the parent inverter of the portion 600A.

FIG. 7 illustrates examples transformations 700 and 702, where the transformation 700 transforms a portion 700A of a clock tree to a portion 700B of the clock tree, and the transformation 702 transforms a portion 702A of a clock tree to a portion 702B of the clock tree. Each of the transformations 700, 702 transforms a portion of a clock tree, which uses buffers, to a portion that uses inverters. In particular, the transformation 700 may convert each buffer of the portion 700A to an inverter and then, above the inverter(s) resulting from the conversion, adding a new parent inverter above the inverter(s) resolving from the conversion. With respect to the transformation 702, the transformation 702 may convert each buffer to an inverter.

FIG. 8 illustrates examples transformations 800 and 802, where the transformation 800 transforms a portion 800A of a clock tree to a portion 800B of the clock tree, and the transformation 802 transforms a portion 802A of a clock tree to a portion 802B of the clock tree. Each of the transformations 800, 802 transforms a portion of a clock tree, which use inverters, to a portion that use buffers. In particular, the transformation 800 may convert each child inverter of the portion 800A to a buffer and then remove the parent inverter of the portion 800A. With respect to the transformation 802, the transformation 802 may convert each inverter to a buffer.

Figure 9:
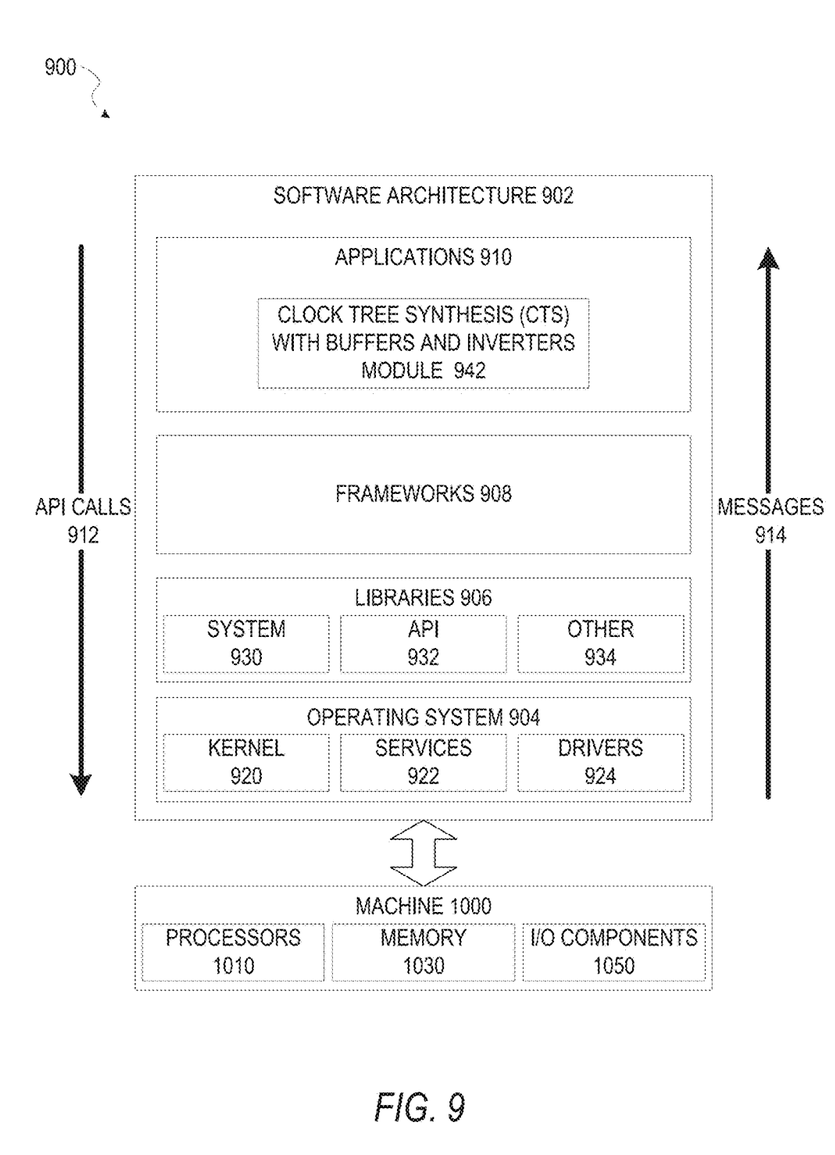
FIG. 9 is a block diagram illustrating an example of a software architecture that may be operating on an electronic design automation (EDA) computing device and may be used with methods for generating a clock tree with mixed buffers and inverters for a circuit design, according to some embodiments.

FIG. 9 is a block diagram 900 illustrating an example of a software architecture 902 that may be operating on an EDA computer and may be used with methods for clock tree generation with buffers and inverters, according to some example embodiments. The software architecture 902 can be used as an EDA computing device to implement any of the methods described above. Aspects of the software architecture 902 may, in various embodiments, be used to store circuit designs, and to generate clock trees with buffers and inverters in an EDA environment to generate circuit designs, from which physical devices may be generated.

FIG. 9 is merely a non-limiting example of a software architecture 902, and it will be appreciated that many other architectures can be implemented to facilitate the functionality described herein. In various embodiments, the software architecture 902 is implemented by hardware such as a machine 1000 of FIG. 10 that includes processors 1010, memory 1030, and I/O components 1050. In this example, the software architecture 902 can be conceptualized as a stack of layers where each layer may provide a particular functionality. For example, the software architecture 902 includes layers such as an operating system 904, libraries 906, software frameworks 908, and applications 910. Operationally, the applications 910 invoke application programming interface (API) calls 912 through the software stack and receive messages 914 in response to the API calls 912, consistent with some embodiments. In various embodiments, any client device, any server computer of a server system, or any other device described herein may operate using elements of the software architecture 902. An EDA computing device described herein may additionally be implemented using aspects of the software architecture 902, with the software architecture 902 adapted for operating to perform routing a net of a circuit design in any manner described herein.

Figure 10:
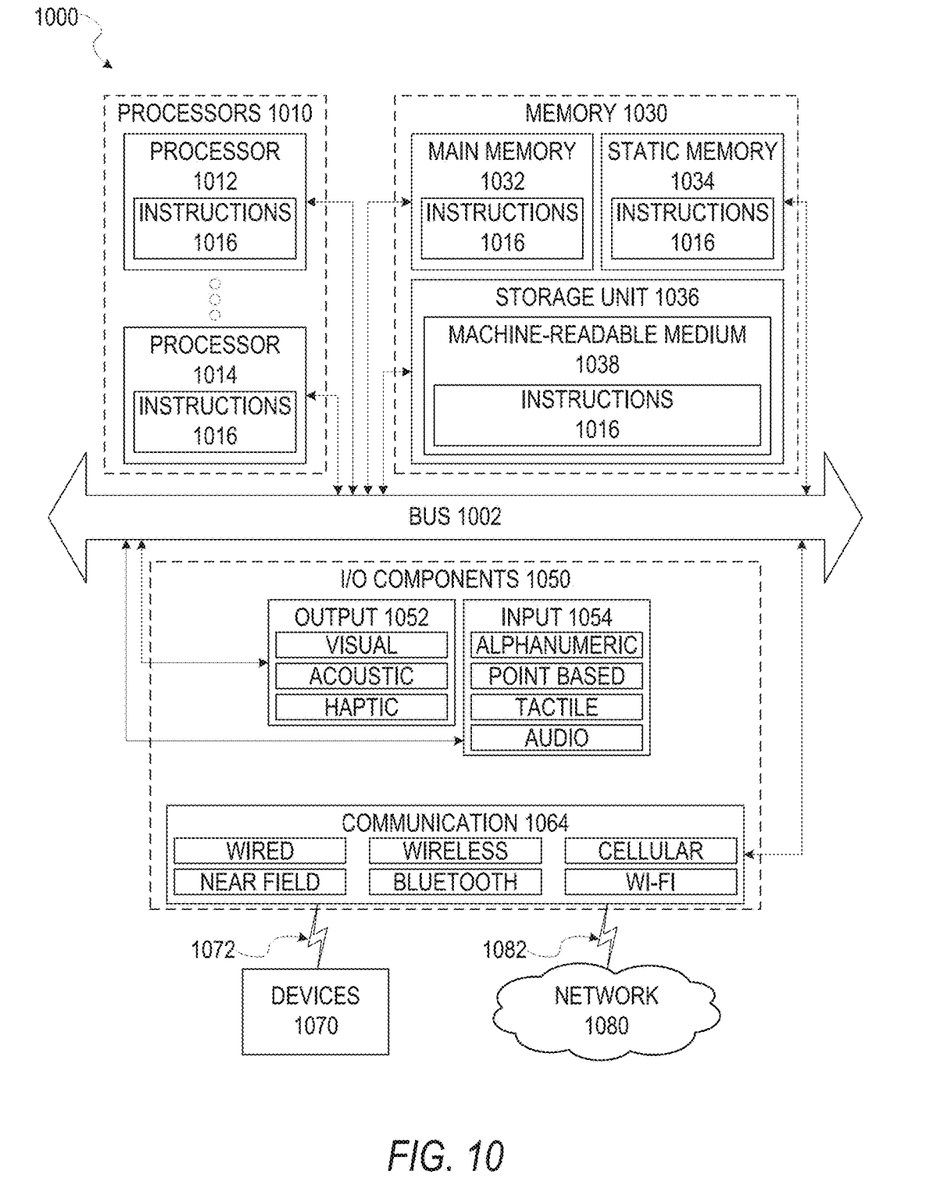
FIG. 10 is a diagram representing a machine in the form of a computer system within which a set of instructions are executed, causing the machine to perform any one or more of the methods discussed herein, according to some example embodiments.

In one embodiment, an EDA application of the applications 910 performs clock tree generation with buffers and inverters according to embodiments described herein using various modules within the software architecture 902. For example, in one embodiment, an EDA computing device similar to the machine 1000 includes the memory 1030 and the one or more processors 1010. The processors 1010 also implement a clock tree synthesis (CTS) with buffers and inverters module 942 for generating a clock tree using buffers and inverters in accordance with various embodiments described herein.

In various other embodiments, rather than being implemented as modules of the one or more applications 910, the CTS with buffers and inverters module 942 may be implemented using elements of the libraries 906, the operating system 904, or the software frameworks 908.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 such as libraries of blocks for use in an EDA environment or other libraries that can provide functions such as memory allocation functions, string manipulation functions, mathematic functions, and the like. In addition, the libraries 906 can include API libraries 932 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 906 may also include other libraries 934.

The software frameworks 908 provide a high-level common infrastructure that can be utilized by the applications 910, according to some embodiments. For example, the software frameworks 908 provide various graphic user interface (GUI) functions, high-level resource management, high-level location services, and so forth. The software frameworks 908 can provide a broad spectrum of other APIs that can be utilized by the applications 910, some of which may be specific to a particular operating system 904 or platform. In various embodiments, the systems, methods, devices, and instructions described herein may use various files, macros, libraries, and other elements of an EDA design environment to implement clock tree generation with buffers and inverters as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 902, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1000 including processors 1010), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 1000, but deployed across a number of machines 1000. In some example embodiments, the processors 1010 or processor-implemented modules are located in a single geographic location (e.g., within a home environment, an office environment, or a server farm). In other example embodiments, the processors or processor-implemented modules are distributed across a number of geographic locations.

FIG. 10 is a diagrammatic representation of the machine 1000 in the form of a computer system within which a set of instructions may be executed for causing the machine 1000 to perform any one or more of the methodologies discussed herein, according to an example embodiment. FIG. 10 shows components of the machine 1000, which is, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 1012 and a processor 1014 that may execute the instructions 1016. The term "processor" is intended to include multi-core processors 1010 that may comprise two or more independent processors 1012, 1014 (also referred to as "cores") that can execute the instructions 1016 contemporaneously. Although FIG. 10 shows multiple processors 1010, the machine 1000 may include a single processor 1012 with a single core, a single processor 1012 with multiple cores (e.g., a multi-core processor 1012), multiple processors 1010 with a single core, multiple processors 1010 with multiple cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown, in an example embodiment, to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., the instructions 1016) for execution by a machine (e.g., the machine 1000), such that the instructions 1016, when executed by one or more processors of the machine (e.g., the processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, the communication components 1064 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a USB).

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling.

Furthermore, the machine-readable medium 1038 is non-transitory (in other words, not having any transitory signals) in that it does not embody a propagating signal. However, labeling the machine-readable medium 1038 "non-transitory" should not be construed to mean that the machine-readable medium 1038 is incapable of movement; the machine-readable medium 1038 should be considered as being transportable from one physical location to another. Additionally, since the machine-readable medium 1038 is tangible, the machine-readable medium 1038 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
   receiving, by a hardware processor, a request to generate, for a circuit design, a clock tree that includes a bottom leaf level comprising a plurality of clock sinks of the circuit design and that includes a top root level comprising a clock signal source of the circuit design;
   in response to the request, generating, by the hardware processor, the clock tree from the bottom leaf level to the top root level, the generating including creating a new driver at a position in the clock tree by:
   generating a first node clustering by clustering a first set of nodes of the clock tree, at a particular level of the clock tree, under a new buffer created at the position;
   generating a second node clustering by clustering a second set of nodes of the clock tree, at the particular level, under a new inverter created at the position;
   determining whether the clock tree according to the first node clustering or the clock tree according to the second node clustering satisfies a set of clock tree design constraints; and based on the determining whether the clock tree according to the first node clustering or the clock tree according to the second node clustering satisfies the set of clock tree design constraints, generating the clock tree according to one of the first node clustering or the second node clustering.

2. The method of claim 1, wherein the generating the clock tree according to one of the first node clustering or the second node clustering comprises:
in response to determining that only the clock tree according to the first node clustering satisfies the set of clock tree design constraints, generating the clock tree according to the first node clustering.

3. The method of claim 1, wherein the generating the clock tree according to one of the first node clustering or the second node clustering comprises:
in response to determining that only the clock tree according to the second node clustering satisfies the set of clock tree design constraints, generating the clock tree according to the second node clustering.

4. The method of claim 1, wherein the generating the clock tree according to one of the first node clustering or the second node clustering comprises:
in response to determining that both the clock tree according to the first node clustering and the clock tree according to the second node clustering satisfy the set of clock tree design constraints:
determining which one of the first node clustering or the second node clustering will cause lower power usage by the clock tree;
in response to determining that the first node clustering will provide lower power usage by the clock tree, generating the clock tree according to the first node clustering; and
in response to determining that the second node clustering will provide lower power usage by the clock tree, generating the clock tree according to the second node clustering.

5. The method of claim 1, wherein the set of clock tree design constraints includes slew within the clock tree.

6. The method of claim 1, wherein the set of clock tree design constraints includes a set of latencies within the clock tree.

7. A device comprising:
a memory storing instructions; and
a hardware processor communicatively coupled to the memory and configured by the instructions to generate a clock tree for a circuit design, the clock tree including a bottom leaf level comprising a plurality of clock sinks of the circuit design, the clock tree including a top root level comprising a clock signal source of the circuit design, the clock tree being generated from the bottom leaf level to the top root level, and the generating including creating a new driver at a position in the clock tree by:
generating a first node clustering by clustering a first set of nodes of the clock tree, at a particular level of the clock tree, under a new buffer created at the position;
generating a second node clustering by clustering a second set of nodes of the clock tree, at the particular level, under a new inverter created at the position;
determining whether the clock tree according to the first node clustering or the clock tree according to the second node clustering satisfies a set of clock tree design constraints; and
based on the determining whether the clock tree according to the first node clustering or the clock tree according to the second node clustering satisfies the set of clock tree design constraints, generating the clock tree according to one of the first node clustering or the second node clustering.

8. The device of claim 7, wherein the generating the clock tree according to one of the first node clustering or the second node clustering comprises:
in response to determining that only the clock tree according to the first node clustering satisfies the set of clock tree design constraints, generating the clock tree according to the first node clustering.

9. The device of claim 7, wherein the generating the clock tree according to one of the first node clustering or the second node clustering comprises:
in response to determining that only the clock tree according to the second node clustering satisfies the set of clock tree design constraints, generating clock tree according to the second node clustering.

10. The device of claim 7, wherein the generating the clock tree according to one of the first node clustering or the second node clustering comprises:
in response to determining that both the clock tree according to the first node clustering and the clock tree according to the second node clustering satisfy the set of clock tree design constraints:
determining which one of the first node clustering or the second node clustering will cause lower power usage by the clock tree;
in response to determining that the first node clustering will provide lower power usage by the clock tree, generating the clock tree according to the first node clustering; and
in response to determining that the second node clustering will provide lower power usage by the clock tree, generating the clock tree according to the second node clustering.

* * * * *